(12) United States Patent
Ozcan

(10) Patent No.: US 11,629,971 B2
(45) Date of Patent: *Apr. 18, 2023

(54) AUDIO PROCESSING APPARATUS

(71) Applicant: Nokia Technologies Oy, Espoo (FI)

(72) Inventor: Koray Ozcan, Farnborough (GB)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,796

(22) Filed: May 11, 2021

(65) Prior Publication Data

US 2021/0262818 A1 Aug. 26, 2021

Related U.S. Application Data

(63) Continuation of application No. 13/951,123, filed on Jul. 25, 2013, now Pat. No. 11,022,456.

(51) Int. Cl.
*G01C 21/30* (2006.01)
*G01C 21/36* (2006.01)
(Continued)

(52) U.S. Cl.
CPC ......... *G01C 21/3629* (2013.01); *G06F 3/165* (2013.01)

(58) Field of Classification Search
CPC .. G01C 21/00; G01C 21/367; G01C 21/3664; G01C 21/3626; G01C 21/36; G01C 21/3638; G01C 21/26; G01C 21/20; G01C 21/3632; G01C 21/3635; G01C 21/34; G01C 21/3629; G01C 21/32; G01C 21/3682; G01C 21/3647; G01C 21/3667; G01C 21/3673; G01C 21/3415; G01C 21/3611; G01C 21/3614; G01C 21/3617; G01C 21/3694; G01C 21/265; G01C 21/28; G01C 17/38; G01C 21/3423; G01C 21/3469; G01C 21/3608; G01C 21/362; G01C 21/3652; G01C 21/3661; G01C 21/3676; G01C 21/3688; G01C 21/3697; G06F 3/04842; G06F 3/0488; G06F 3/011; G06F 3/016; G06F 3/0482; G06F 17/30864; G06F 17/28; H04M 2250/12; H04M 2250/10; H04M 2250/22; H04M 2250/52; H04M 1/72572; G01S 13/04; G01S 17/89; G01S 15/06; G01S 15/42; G01S 13/89; G01S 15/89; G01S 2205/002

USPC ....... 701/533, 400, 538, 408, 428, 410, 118, 701/412, 420, 425, 416, 417, 418, 451, 701/454, 491, 526

See application file for complete search history.

(56) References Cited

U.S. PATENT DOCUMENTS

| 5,935,193 A | 8/1999 | Saiki | 340/990 |
| 6,078,865 A | 6/2000 | Koyanagi | 340/988 |

(Continued)

*Primary Examiner* — Kharye Pope
(74) *Attorney, Agent, or Firm* — Harrington & Smith

(57) ABSTRACT

An example approach for navigation is provided with an apparatus comprising: a navigation processor configured to generate at least one navigation command; and an audio processor configured to determine at least one directional audio parameter so as to provide a direction, the at least one directional audio parameter being based on the navigation command and further configured to process at least one audio signal based on the at least one directional audio parameter such that a virtual sound image of a navigation routing is generated based on the processed at least one audio signal.

20 Claims, 4 Drawing Sheets

(51) Int. Cl.
*G06F 3/16* (2006.01)
*G10L 13/00* (2006.01)

(56) References Cited

U.S. PATENT DOCUMENTS

| | | | | |
|---|---|---|---|---|
| 6,172,641 | B1* | 1/2001 | Millington | G01C 21/26 342/357.31 |
| 6,612,211 | B1 | 9/2003 | Stigliano et al. | 704/10 |
| 6,845,338 | B1 | 1/2005 | Willins | 340/988 |
| 2005/0117754 | A1 | 6/2005 | Sakawaki | 381/71.6 |
| 2005/0128106 | A1* | 6/2005 | Nakaishi | G01C 21/3629 340/988 |
| 2006/0142941 | A1 | 6/2006 | Imai | 701/431 |
| 2007/0016368 | A1* | 1/2007 | Chapin | G01C 21/3644 701/426 |
| 2007/0033032 | A1 | 2/2007 | Schubert | 704/235 |
| 2008/0039034 | A1* | 2/2008 | Fujita | G11B 27/034 455/179.1 |
| 2008/0069370 | A1* | 3/2008 | Chang | H04B 1/034 381/86 |
| 2008/0082326 | A1 | 4/2008 | Venkataraman | 704/228 |
| 2008/0211693 | A1* | 9/2008 | Okuno | G01C 21/3667 340/995.26 |
| 2008/0215239 | A1* | 9/2008 | Lee | G01C 21/3629 701/441 |
| 2009/0192705 | A1 | 7/2009 | Golding et al. | 701/201 |
| 2009/0192707 | A1* | 7/2009 | Nakatsuka | G01C 21/3629 340/384.1 |
| 2009/0306891 | A1 | 12/2009 | Jeon | 701/533 |
| 2009/0307207 | A1* | 12/2009 | Murray | G11B 27/105 707/999.005 |
| 2010/0100310 | A1 | 4/2010 | Eich | 701/533 |
| 2011/0098056 | A1 | 4/2011 | Rhoads | 455/456.1 |
| 2011/0153191 | A1* | 6/2011 | Dhanani | G01C 21/3617 701/533 |
| 2011/0202345 | A1* | 8/2011 | Meyer | G10L 13/033 704/E13.011 |
| 2012/0303274 | A1 | 11/2012 | Su et al. | 701/533 |
| 2013/0158856 | A1* | 6/2013 | Xiang | G01C 21/26 701/408 |
| 2013/0253834 | A1 | 9/2013 | Slusar | 701/408 |
| 2013/0325322 | A1 | 12/2013 | Blumenberg | 701/420 |
| 2014/0019036 | A1 | 1/2014 | Lemay et al. | 701/400 |
| 2014/0019037 | A1 | 1/2014 | Christensen | 701/409 |
| 2014/0019135 | A1* | 1/2014 | Talwar | G10L 13/08 704/E13.011 |
| 2014/0025287 | A1 | 1/2014 | Christensen | 701/409 |
| 2014/0136187 | A1 | 5/2014 | Wolverton | 704/9 |
| 2014/0244156 | A1 | 8/2014 | Magnusson et al. | 701/418 |
| 2015/0019132 | A1 | 1/2015 | Gusikhin et al. | 701/537 |

* cited by examiner

AUDIO PROCESSING APPARATUS

RELATED APPLICATION

This application is a continuation of U.S. patent application Ser. No. 13/951,123, filed Jul. 25, 2013, which is hereby incorporated by reference in its entirety.

FIELD

The present application relates to apparatus for audio signal processing. The invention further relates to, but is not limited to, apparatus for audio signal processing within mobile devices.

BACKGROUND

Spatial audio signals are being used in greater frequency to produce a more immersive audio experience. A stereo or multi-channel output can be generated by a listening apparatus such as headphones, headset, multi-channel loudspeaker arrangement.

Navigation devices and applications such as Nokia drive and Nokia maps are commonly used in cars to assist the driver and also used in hand held mode to allow a pedestrian to navigate unknown cities and countryside. In these systems, navigation displays provide guidance to the user and show the direction visually. In addition, a navigation system generates audio signals such as voice signals to provide guidance for the desired navigation direction. The navigation voice signal provides guidance sound image is typically a mono playback.

SUMMARY

Aspects of this application thus provide navigation apparatus able to generate and process audio signals to provide audio directional indications to the apparatus user.

According to a first aspect there is provided a method comprising: generating at least one navigation command; determining at least one directional audio parameter so as to provide a direction, the at least one directional audio parameter being based on the navigation command; and processing at least one audio signal based on the at least one directional audio parameter such that a virtual sound image of a navigation routing is generated based on the processed at least one audio signal.

The at least one directional audio parameter may comprise at least one of: at least one interaural level difference based on the at least one navigation command; at least one interaural time difference based on the at least one navigation command; at least one interaural phase difference based on the at least one navigation command; and a head related transfer function based on the at least one navigation command.

The at least one navigation command may further comprise at least one directional indication associated with the at least one audio signal, and wherein determining at least one directional audio parameter is based on the at least one directional indication.

The at least one navigation command may further comprise at least one distance indication, and the method further comprises: determining at least one distance audio parameter, the at least one distance audio parameter is based on the at least one distance indication; and processing the at least one audio signal based on the at least one distance audio parameter.

The at least one distance audio parameter may comprise a gain value based on the at least one distance value.

The gain value may be inversely proportional to the at least one distance value, up to a determined maximum gain value.

The method may further comprise generating the at least one audio signal based on the at least one navigation command.

The method may further comprise: generating at least one further navigation command; determining whether to generate at least one further directional audio parameter based on the at least one further navigation command; and processing at least one further audio signal based on the at least one further directional audio parameter.

The method may further comprise: generating at least one visual information element based on the at least one navigation command; and displaying the at least one visual information element.

Generating at least one navigation command may comprise: determining a location of an apparatus; determining a destination of the apparatus; routing the apparatus from the location of the apparatus to the destination of the apparatus; and generating the at least one navigation command from the routing.

Routing the apparatus from the location of the apparatus to the destination of the apparatus may comprise determining at least one routing path from the location of the apparatus to the destination of the apparatus.

Generating the at least one navigation command from the routing may comprise at least one of: generating a routing parameter associated with a routing change; and generating a routing parameter associated with the destination, the routing parameter comprising at least one of: at least one directional indication; and at least one distance indication.

The at least one audio signal may comprise: a first channel audio signal; and a second channel audio signal.

According to a second aspect there is provided an apparatus comprising: means for generating at least one navigation command; means for determining at least one directional audio parameter so as to provide a direction, the at least one directional audio parameter being based on the navigation command; and means for processing at least one audio signal based on the at least one directional audio parameter such that a virtual sound image of a navigation routing is generated based on the processed at least one audio signal.

The at least one directional audio parameter may comprise at least one of: at least one interaural level difference based on the at least one navigation command; at least one interaural time difference based on the at least one navigation command; at least one interaural phase difference based on the at least one navigation command; and a head related transfer function based on the at least one navigation command.

The at least one navigation command may further comprise at least one directional indication associated with the at least one audio signal, and wherein the means for determining at least one directional audio parameter is based on the at least one directional indication.

The at least one navigation command may further comprise at least one distance indication, and the apparatus further comprises: means for determining at least one distance audio parameter, the at least one distance audio parameter is based on the at least one distance indication; and means for processing the at least one audio signal based on the at least one distance audio parameter.

The at least one distance audio parameter may comprise a gain value based on the at least one distance value.

The gain value may be inversely proportional to the at least one distance value, up to a determined maximum gain value.

The apparatus may further comprise means for generating the at least one audio signal based on the at least one navigation command.

The apparatus may further comprise: means for generating at least one further navigation command; means for determining whether to generate at least one further directional audio parameter based on the at least one further navigation command; and means for processing at least one further audio signal based on the at least one further directional audio parameter.

The apparatus may further comprise: means for generating at least one visual information element based on the at least one navigation command; and means for displaying the at least one visual information element.

The means for generating at least one navigation command may comprise: means for determining a location of an apparatus; means for determining a destination of the apparatus; means for routing the apparatus from the location of the apparatus to the destination of the apparatus; and means for generating the at least one navigation command from the routing.

The means for routing the apparatus from the location of the apparatus to the destination of the apparatus may comprise means for determining at least one routing path from the location of the apparatus to the destination of the apparatus.

The means for generating the at least one navigation command from the routing may comprise at least one of: means for generating a routing parameter associated with a routing change; and means for generating a routing parameter associated with the destination, the routing parameter may comprise at least one of: at least one directional indication; and at least one distance indication.

The at least one audio signal may comprise: a first channel audio signal; and a second channel audio signal.

According to a third aspect there is provided an apparatus comprising at least one processor and at least one memory including computer program code for one or more programs, the at least one memory and the computer program code configured to, with the at least one processor, cause the apparatus at least to: generate at least one navigation command; determine at least one directional audio parameter so as to provide a direction, the at least one directional audio parameter being based on the navigation command; and process at least one audio signal based on the at least one directional audio parameter such that a virtual sound image of a navigation routing is generated based on the processed at least one audio signal.

The at least one directional audio parameter may comprise at least one of: at least one interaural level difference based on the at least one navigation command; at least one interaural time difference based on the at least one navigation command; at least one interaural phase difference based on the at least one navigation command; and a head related transfer function based on the at least one navigation command.

The at least one navigation command may further comprise at least one directional indication associated with the at least one audio signal, and wherein determining at least one directional audio parameter may be based on the at least one directional indication.

The at least one navigation command may further comprise at least one distance indication, and the apparatus further may be caused to: determine at least one distance audio parameter, the at least one distance audio parameter being based on the at least one distance indication; and processing the at least one audio signal based on the at least one distance audio parameter.

The at least one distance audio parameter may comprise a gain value based on the at least one distance value.

The gain value may be inversely proportional to the at least one distance value, up to a determined maximum gain value.

The apparatus may further be caused to generate the at least one audio signal based on the at least one navigation command.

The apparatus may further be caused to: generate at least one further navigation command; determine whether to generate at least one further directional audio parameter based on the at least one further navigation command; and process at least one further audio signal based on the at least one further directional audio parameter.

The apparatus may further be caused to: generate at least one visual information element based on the at least one navigation command; and display the at least one visual information element.

Generating at least one navigation command may cause the apparatus to: determine a location of an apparatus; determine a destination of the apparatus; route the apparatus from the location of the apparatus to the destination of the apparatus; and generate the at least one navigation command from the routing.

Routing the apparatus from the location of the apparatus to the destination of the apparatus may cause the apparatus to determine at least one routing path from the location of the apparatus to the destination of the apparatus.

Generating the at least one navigation command from the routing may cause the apparatus to perform at least one of: generate a routing parameter associated with a routing change; and generate a routing parameter associated with the destination, the routing parameter may comprise at least one of: at least one directional indication; and at least one distance indication.

The at least one audio signal may comprise: a first channel audio signal; and a second channel audio signal.

According to a fourth aspect there is provided an apparatus comprising: a navigation processor configured to generate at least one navigation command; and an audio processor configured to determine at least one directional audio parameter so as to provide a direction, the at least one directional audio parameter being based on the navigation command and further configured to process at least one audio signal based on the at least one directional audio parameter such that a virtual sound image of a navigation routing is generated based on the processed at least one audio signal.

The at least one directional audio parameter may comprise at least one of: at least one interaural level difference based on the at least one navigation command; at least one interaural time difference based on the at least one navigation command; at least one interaural phase difference based on the at least one navigation command; and a head related transfer function based on the at least one navigation command.

The at least one navigation command may further comprise at least one directional indication associated with the at least one audio signal, and wherein the audio processor may be configured to determine at least one directional audio parameter based on the at least one directional indication.

The at least one navigation command may further comprise at least one distance indication, and the audio processor may be further configured to: determine at least one distance audio parameter, the at least one distance audio parameter being based on the at least one distance indication; and processing the at least one audio signal based on the at least one distance audio parameter.

The at least one distance audio parameter may comprise a gain value based on the at least one distance value.

The gain value may be inversely proportional to the at least one distance value, up to a determined maximum gain value.

The audio processor may further be configured to generate the at least one audio signal based on the at least one navigation command.

The navigation processor may further be configured to generate at least one further navigation command; and the audio processor may be configured to determine whether to generate at least one further directional audio parameter based on the at least one further navigation command; and process at least one further audio signal based on the at least one further directional audio parameter.

The apparatus may further comprise: a display processor configured to generate at least one visual information element based on the at least one navigation command; and a display configured to display the at least one visual information element.

The apparatus may comprise: a location processor configured to determine a location of an apparatus; and a user input configured to provide a destination of the apparatus, wherein the navigation processor may be configured to: route the apparatus from the location of the apparatus to the destination of the apparatus; and generate the at least one navigation command from the routing.

The navigation processor configured to route the apparatus from the location of the apparatus to the destination of the apparatus may be configured to determine at least one routing path from the location of the apparatus to the destination of the apparatus.

The navigation processor configured to generate the at least one navigation command from the routing may be configured to perform at least one of: generate a routing parameter associated with a routing change; and generate a routing parameter associated with the destination, the routing parameter may comprise at least one of: at least one directional indication; and at least one distance indication.

The at least one audio signal may comprise: a first channel audio signal; and a second channel audio signal.

According to a fifth aspect an apparatus may comprise: at least one processor; at least one memory; at least one display; at least one transceiver; a navigation processor configured to generate at least one navigation command; and an audio processor configured to determine at least one directional audio parameter so as to provide a direction, the at least one directional audio parameter being based on the navigation command and further configured to process at least one audio signal based on the at least one directional audio parameter such that a virtual sound image of a navigation routing is generated based on the processed at least one audio signal.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS

The following describes in further detail suitable apparatus and possible mechanisms for the provision of effective audio processing to assist the user of navigation systems.

As described herein navigation systems typically use visual information, such as maps on displays and audio signals, such as voice instructions to assist navigation in unfamiliar environments. In some countries such as the UK, the traffic conditions can be complex where there can be compound roundabouts (roundabouts which are clustered) or complex side road configurations.

Associated with this is the requirement that, particularly for driving safety, the user should not be overburdened with information such as requiring to study the displayed map and that the system should attempt to provide most of the information to the user via the audio signals. This can also be the situation in cycling navigation, or even pedestrian based navigation where environmental conditions, such as the fear of crime or busy pavements, can prevent the user from constantly viewing the navigation system.

The concept as discussed in embodiments herein is to enable an enhanced navigation system where the navigation information audio signals (for example voice audio signals) are processed and reproduced such that the audio signals are presented to user based on a direction associated with the audio signals. In such embodiments the navigation system such as the mobile apparatus or device controls and reproduces the audio signals so as to create a virtual sound image in the direction of the route. In some embodiments, the navigation system can be configured to generate the audio signals to be perceived as coming from a central direction (in other words with no panning) and a virtual audio image pans towards the direction where the user/driver aims based on the direction of the navigation.

Figure 1:
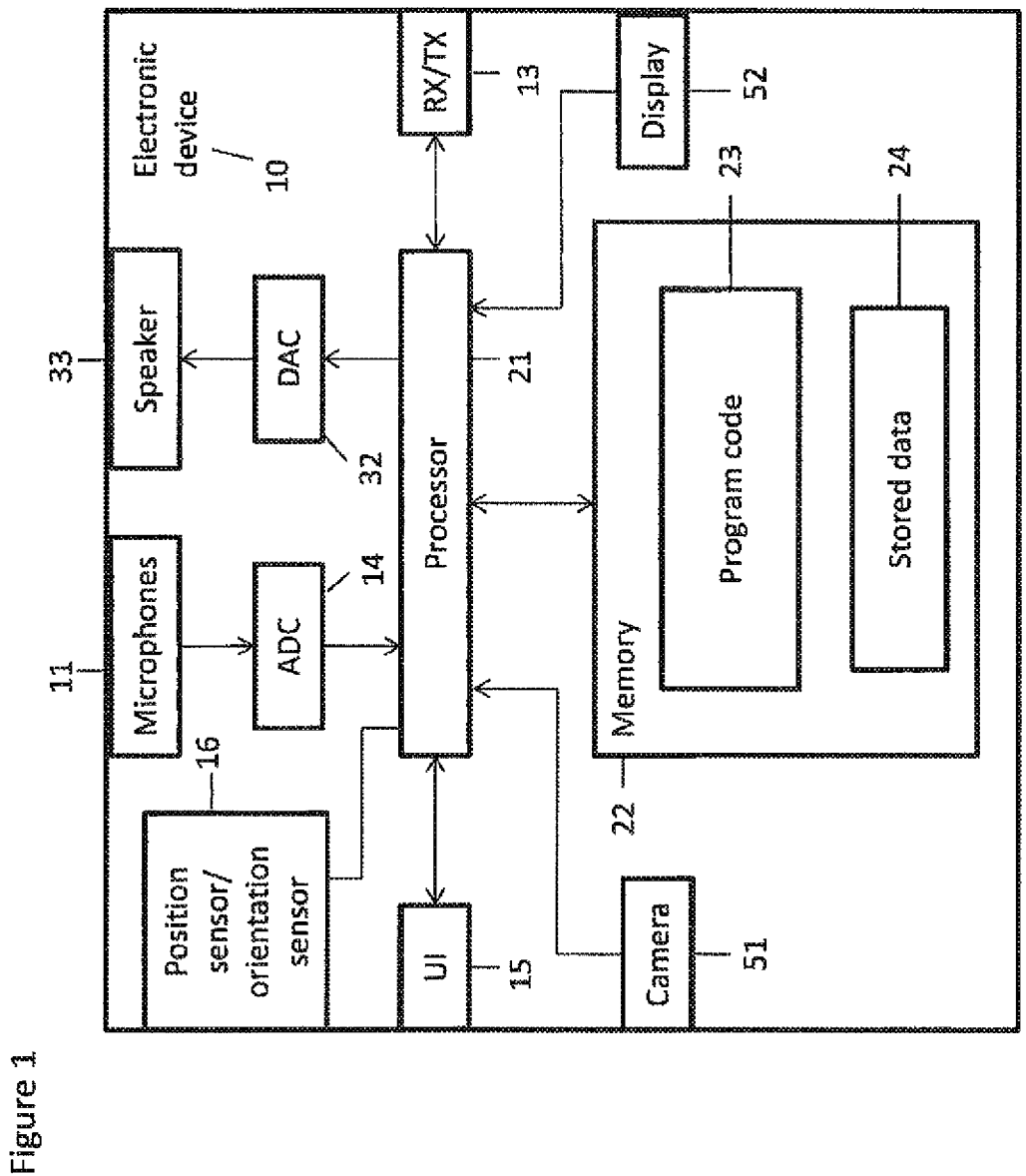
FIG. 1 shows schematically an apparatus suitable for being employed in some embodiments.

In this regard reference is first made to FIG. 1 which shows a schematic block diagram of an exemplary apparatus or electronic device 10, which may be used as for example as a navigation system.

The electronic device 10 may for example be a mobile terminal or user equipment of a wireless communication system. In some embodiments the apparatus can be a satellite navigation device commonly known as a GPS. However it would be understood that the apparatus can be implemented within any suitable audio player or audio recorder, such as an MP3 player, a media recorder/player (also known as an MP4 player), or any suitable portable apparatus suitable for generating audio signals. In some embodiments the electronic device or apparatus 10 is an embedded apparatus or device within a vehicle, such as a satellite navigation apparatus within a car or goods vehicle.

The apparatus 10 can in some embodiments comprise an audio-video subsystem. The audio-video subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 11 is a digital microphone array, in other words configured to generate a digital signal output (and thus not requiring an analogue-to-digital converter). The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'integrated' microphones containing both audio signal generating and analogue-to-digital conversion capability.

In some embodiments the apparatus 10 audio-video subsystem further comprises a digital-to-analogue converter 32 for converting digital audio signals from a processor 21 to a suitable analogue format. The digital-to-analogue converter (DAG) or signal processing means 32 can in some embodiments be any suitable DAG technology.

Furthermore the audio-video subsystem can comprise in some embodiments a speaker or speakers 33. The speaker or speakers 33 can in some embodiments receive the output from the digital-to-analogue converter 32 and present the analogue audio signal to the user. The speaker or speakers 33 can be any suitable audio transducer system configured to generate acoustic waves which can produce virtual sound images in various directions. In some embodiments the speaker or speakers 33 can be representative of an audio output configured to output a suitable audio signal format. For example the speaker 33 can be representative of an audio output to a multi-speaker arrangement (such as a car audio system), a headset (for example a set of headphones, or cordless headphones). The audio output can be any suitable audio output, for example a wired connection (audio jack, usb connection) or a wireless connection (such as a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA)).

In some embodiments the apparatus audio-video subsystem comprises a camera 51 or image capturing means configured to supply to the processor 21 image data. In some embodiments the camera can be configured to supply multiple images over time to provide a video stream.

In some embodiments the apparatus audio-video subsystem comprises a display 52. The display or image display means can be configured to output visual images which can be viewed by the user of the apparatus. In some embodiments the display can be a touch screen display suitable for supplying input data to the apparatus. The display can be any suitable display technology, for example the display can be implemented by a flat panel comprising cells of LCD, LED, OLEO, or 'plasma' display implementations.

Although the apparatus 10 is shown having both audio/video capture and audio/video presentation components, it would be understood that in some embodiments the apparatus 10 can comprise the audio presentation parts of the audio subsystem only such that in some embodiments the speaker (for audio presentation) is present. Similarly in some embodiments the apparatus 10 can comprise the video presentation parts of the video subsystem only such that in some embodiments the display 52 (for video presentation) is present.

In some embodiments the apparatus 10 comprises a processor 21. The processor 21 is coupled to the audio-video subsystem and specifically in some examples the analogue-to-digital converter 14 for receiving digital signals representing audio signals from the microphone 11, the digital-to-analogue converter (DAG) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example audio processing and audio presentation routines. In some embodiments the program codes can be configured to perform audio signal processing or mapping or spatial audio signal processing.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments as described herein comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, and a gyroscope or be determined by the motion of the apparatus using the positioning estimate.

It is to be understood again that the structure of the electronic device 10 could be supplemented and varied in many ways.

Figure 2:
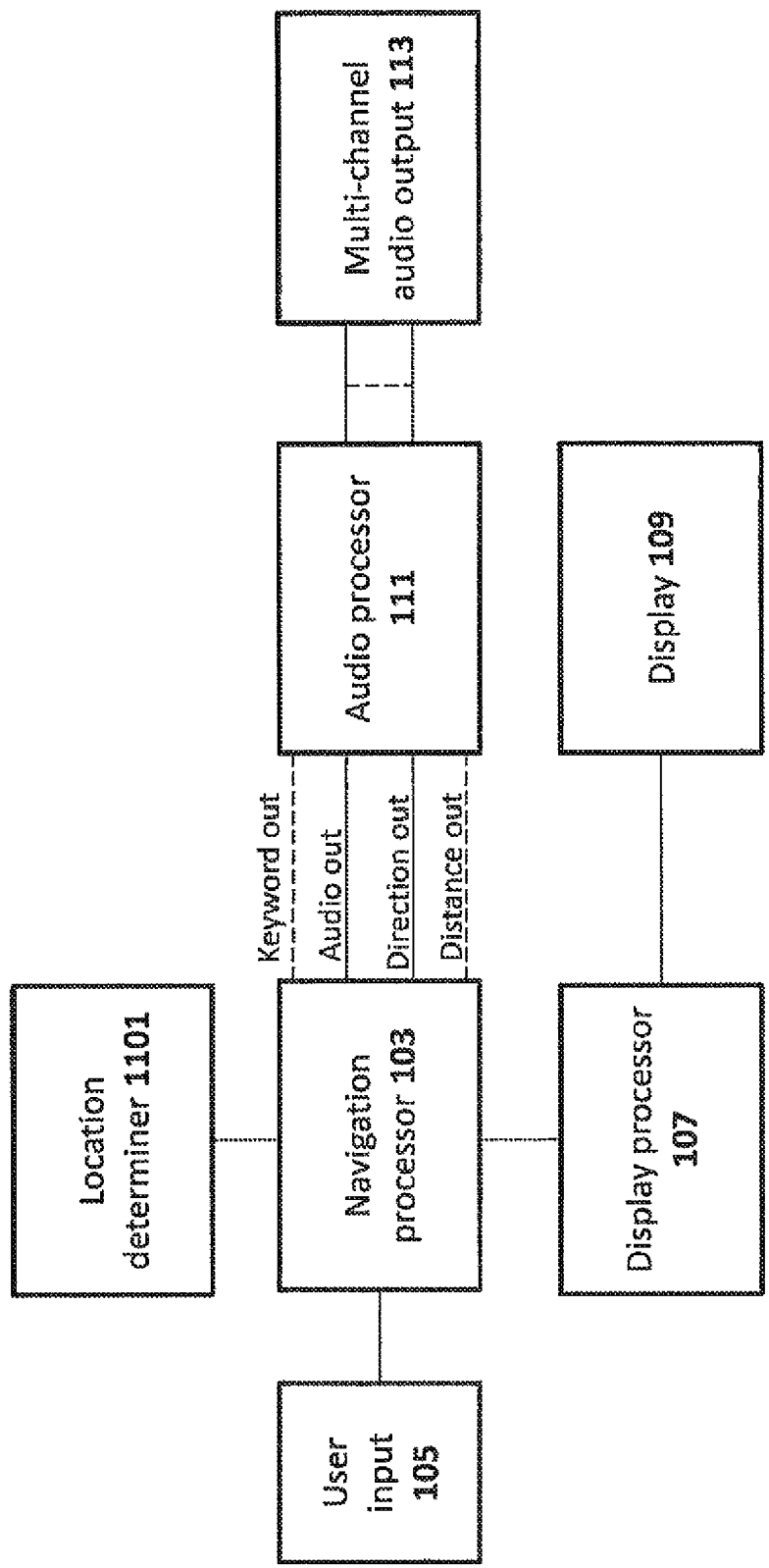
FIG. 2 shows schematically a navigation system suitable for implementing embodiments as described herein.

With respect to FIG. 2 an example navigation system suitable for implementing embodiments as described herein is shown.

In some embodiments the navigation system comprises a location determiner 101. The location determiner can for example receive the information from the position sensor/orientation sensor 16 and determine a location and orientation of the device. The location determiner can be any suitable location and/or orientation determiner. The location determiner 101 can in some embodiments output the determined location/orientation information to the navigation processor 103.

Figure 3:
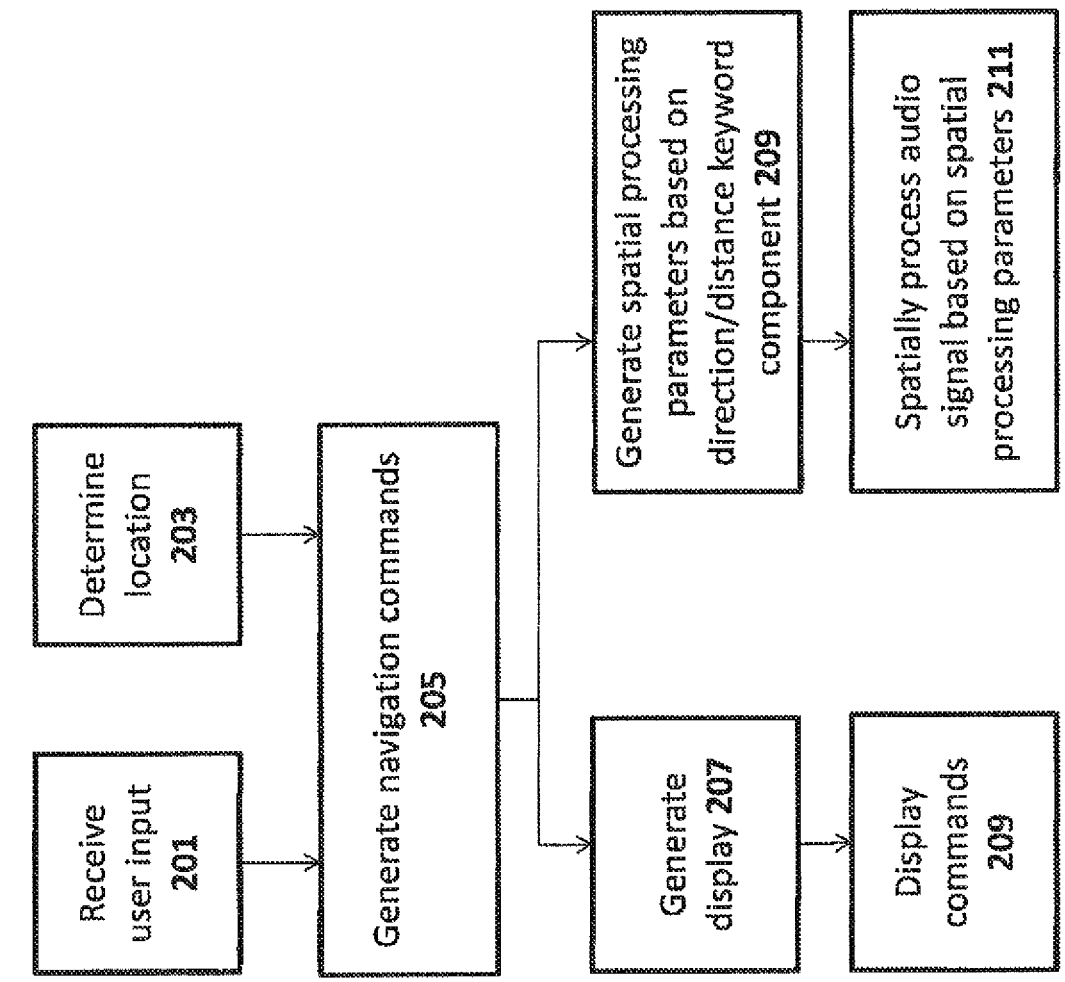
FIG. 3 shows schematically a flow diagram of the operation of the navigation system shown in FIG. 2 according to some embodiments.

The operation of determining the location/orientation is shown in FIG. 3 by step 203.

In some embodiments the navigation system comprises a user input 105. The user input 105 is configured to receive the input from the user, such as for example a final destination or requested interim stop. The user input 105 can in some embodiments output this to the navigation processor 103. The user input 105 can in some embodiments be received from the user interface 15.

The operation of receiving a user input is shown in FIG. 3 by step 201.

In some embodiments the navigation system comprises a navigation processor 103. The navigation processor 103 is configured to receive the requested location or locations from the user input 105, and further receive the current location/orientation of the apparatus from the location determiner 101.

The navigation processor 103 can in some embodiments be configured to determine or generate a route from the current location to the desired location. In some embodiments the navigation processor 103 can perform the routing by using a stored or downloaded road or path network according to any suitable method. It would be understood that in some embodiments the navigation processor 103 can perform this generation of a route by passing a routing request to a third party, which generates a route and transmits it back to the navigation processor 103. Furthermore in some embodiments the navigation processor 103 can be configured to receive further information which can be used to generate the routing, such as traffic or road condition information.

In some embodiments the process of generating a route comprises generating a sequence or series of navigation commands. The navigation commands can in some embodiments be represented by visual information such as displaying a route on a map the route or displaying a visual representation of the upcoming road and direction to be taken. Furthermore the navigation processor 103 can in some embodiments be configured to output the visual commands to a display processor 107.

Furthermore in some embodiments the navigation processor 103 is configured to generate audio commands such as audio signals to indicate in which direction to turn or how far before turning. In some embodiments the navigation processor 103 can be configured to output the audio signal to an audio processor 111.

Furthermore in some embodiments the navigation processor 103 can be configured to output with the audio signal a suitable direction value (on a direction output). The direction value can in some embodiments be output to an audio processor 111. In some embodiments the direction value indicates a direction or orientation. In some embodiments the direction or orientation is relative to the co-ordinates of the current apparatus and/or road co-ordinates before the turn. This direction command can in some embodiments be a direction value associated with the final destination relative to the apparatus, or a direction value associated with a route navigation command.

The audio signal output and the directional value output can then be passed to the audio processor 111.

In some embodiments the audio signal is a suitable signal or command to generate a suitable voice synthesis routine. In such embodiments the audio signal can comprise both the audio signal and the associated direction value.

In some embodiments the navigation processor can further be configured to generate a 'keyword' indicator associated with the audio signal and output this to the audio processor 111. A keyword indicator can be used for example to determine which of the audio signals are to be spatially processed and which ones are to be presented without processing.

In some embodiments the navigation processor 103 can further be configured to generate a distance value associated with the audio signal to the audio processor 111.

The operation of generating navigation commands (such as the visual information and the audio signal and associated information) is shown in FIG. 3 by step 205.

In some embodiments the navigation system comprises a display processor 107. The display processor 107 can be configured to receive the visual information from the navigation processor 103 and generate a suitable display format to be passed to the display. The display processor 107 can thus generate in some embodiments a map and/or routing information. The display processor 107 can output the display information in a suitable format to a display 109.

The operation of generating a display is shown in FIG. 3 by step 207.

In some embodiments the navigation system comprises a display 109 configured to receive the display information from the display processor 107 and display the visual information from the navigation processor 103 in a suitable format that can be seen by the user of the apparatus.

The operation of displaying the visual information is shown in FIG. 3 by step 209.

It would be understood that in some embodiments the navigation processor 103 is configured to output only audio signals and associated information. In other words the visual information as described herein is for completeness and therefore the generation of the visual information, the display processor 107 and display 109 can be considered to be optional components of the navigation system.

In some embodiments the navigation system comprises an audio processor 111. The audio processor 111 is configured in some embodiments to receive the audio signal and associated components (such as direction values, distance values and keyword indicators) from the navigation processor and generate a suitable audio output which can be presented to the user via a suitable multi-channel system. In other words the navigation commands can be in some embodiments used to determine directional audio parameters. The directional audio parameters are then used to process the audio signals to produce a virtual sound image of a navigation routing. The directional audio parameters can for example be at least one interaural level difference based on the at least one navigation command, at least one interaural time difference based on the at least one navigation command, at least one interaural phase difference based on the at least one navigation command, and a head related transfer function based on the at least one navigation command.

In some embodiments the at least one navigation command further comprises at least one directional indication associated with the at least one audio signal, where determining at least one directional audio parameter can be based on the at least one directional indication. The directional indication can be any suitable data format or type indicating a direction or directions either with respect to local routing or end routing directions.

Furthermore in some embodiments the navigation command comprises at least one distance indication, and the audio processor can be configured to determine at least one distance audio parameter. The at least one distance audio parameter would be understood to be based on the at least one distance indication. Furthermore the audio processor can be configured to process the at least one audio signal based on the at least one distance audio parameter. The distance indication can be any suitable data format or type indicating a distance or distances either with respect to local or end routing and can in some embodiments be associated with a directional indication.

Therefore in some embodiments the audio processor is configured to receive the audio signal to be output or a suitable audio signal representation or indicator. An example of a suitable audio signal representation can be a pointer to memory within which the audio signal is stored. Furthermore the audio signal is as described herein associated with at least one parameter such as a directional value (or parameter).

The audio processor 111 can in some embodiments be configured to generate from the directional value associated with the audio signal at least one spatial processing parameter or directional audio parameter to be applied to the audio signal.

The operation of generating spatial processing parameters based on the directional value is shown in FIG. 3 by step 209.

The audio processor 111 can then process the audio signal using the at least one spatial processing parameter to generate a suitable multi-channel audio signal which can be output to a suitable multi-channel audio output 113 to be presented to the user.

The operation of spatially processing the audio signal based on the spatial processing parameter is shown in FIG. 3 by step 211.

In some embodiments the navigation system comprises a multi-channel audio output 113. The multi-channel audio output 113 can be for example a pair of headphones configured to output a binaural audio signal or a multi-channel audio system such as an 'in car' audio system with multiple speakers. The multi-channel audio output 113 can in some embodiments be configured to replay or present the audio signal with the spatial components.

Figure 4:
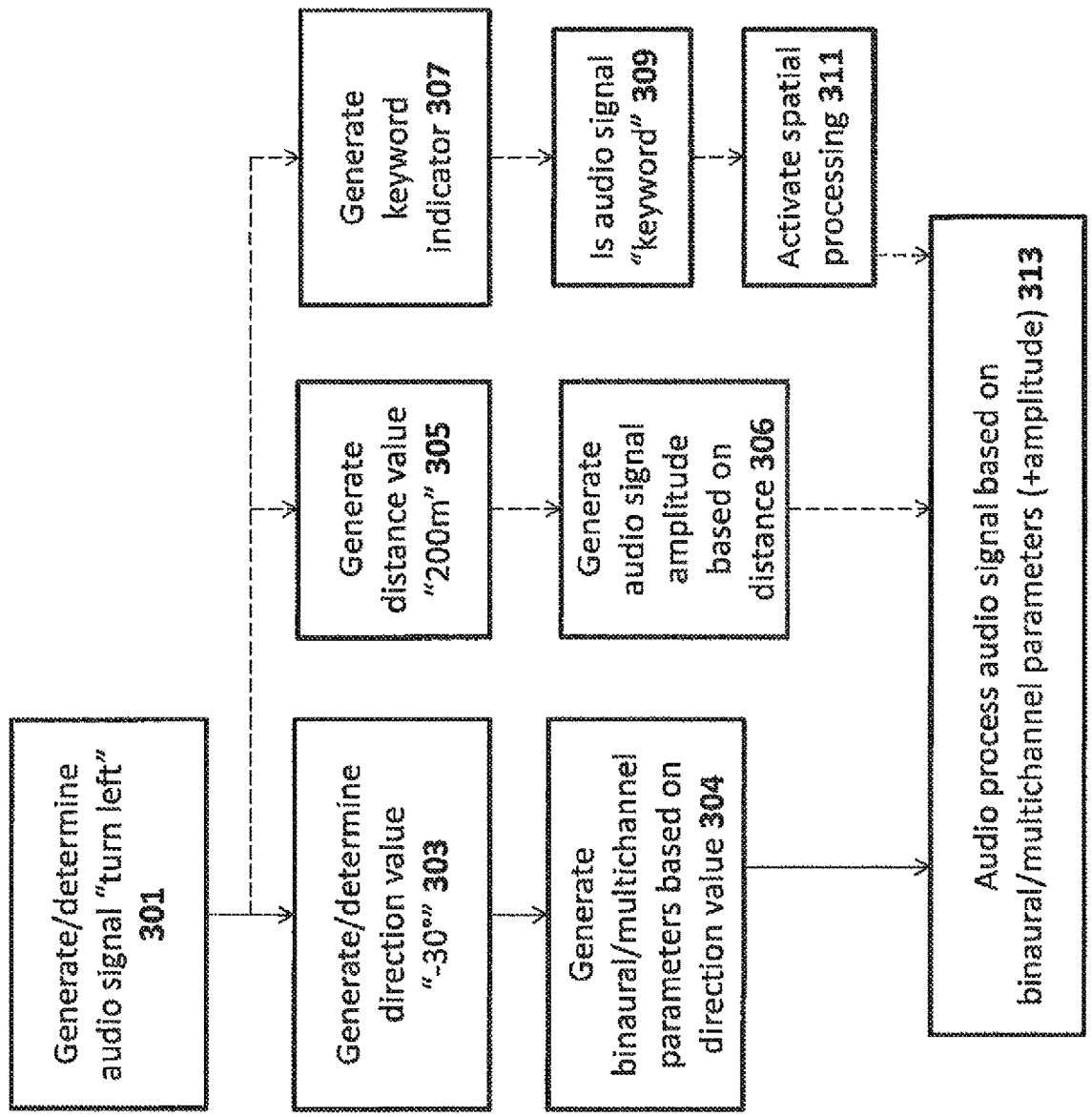
FIG. 4 shows schematically a flow diagram of the operation of the generation of audio signals with spatial information or components and the processing of the audio signal based on the spatial information or components according to some embodiments.

With respect to FIG. 4 the operation of the navigation processor 103 and the audio processor 111 with respect to the generation and processing of audio signals using the determined audio processing parameters or cues is shown in further detail.

In some embodiments the navigation processor 103 can be configured to generate or determine/generate an audio signal. The audio signal can for example be a voice command to be output in order to inform the user of the navigation system that a change in direction is to be made. Thus for example an example audio signal can be a synthesized audio signal representing a voice command saying "turn left". In some embodiments as discussed herein the audio signal can be a representation or pointer which causes the audio processor to generate or synthesize the audio signal. For example the audio signal in some embodiments can be a text message or other message which causes the audio signal to generate the "turn left" voice signal.

The operation of generating or determining an audio signal is shown in FIG. 4 by step 301.

Furthermore the navigation processor 103 can be configured to generate or determine an associated direction value. The direction value can for example be based on the generated audio signal. Thus for example in some embodiments the "turn left" audio signal can be associated with a direction value of "−60°" or "90°". In some embodiments the direction value can be based on part of the generated audio signal. For example where the audio signal comprises a distance component "turn left in 200 m" then the navigation processor can analyses the audio signal and generate a direction value of "−60°". Similarly the navigation processor can analyses the audio signal "turn left in 100 m" and generate a direction value of "−75°" because 30 of the 100 m part of the audio signal compared to the 200 m part of the audio signal.

It would be understood that in some embodiments the level of the audio signal can be changed based on the distance values. For example 100m can provide a louder playback volume than 200 m so that the driver is provided with a volume based indication that the target (either the next turn or direction change or final target) is approaching. In some embodiments the audio playback can therefore provide a perception of direction and distance—thus for example where the user is to turn left then the virtual source can appear from the left and the signal strength can adjust based on how close or far away the apparatus is from the target point. Although audio volume is described herein it would be understood that the level of the audio signal can be changed based on the distance values in the form of determining a gain value for an amplifier.

In other words in some embodiments the audio processor can be configured to determine a gain value which is inversely proportional to the distance. In some embodiments the gain value is limited by a threshold value to prevent the gain value becoming too loud. In other words in some embodiments the volume level, loudness, audio playback level, or power can be limited so that the volume, loudness, audio playback level or power of the playback does not exceed a determined threshold.

In some embodiments the direction value is defined and selected in order to produce a perception of whichever direction is the aimed direction (in other words producing a perception of the "−60°" or "−75°". In some embodiments therefore the apparatus can comprise a look up table where audio signals or representations are used as the key to determine an associated direction value. Thus in such embodiments the processor is configured to select an associated or 'equivalent' direction value as the car (or someone walking) is routed or aiming to turn left/right. It would be understood that in some embodiments the audio signals or representations can for example comprises an audio signal comprising a data component with the direction value to be output.

In some embodiments the representation comprises a data component comprising the direction value, which is used by a voice synthesis apparatus to generate a suitable audio signal and further the processor can apply a suitable processing based on the data component value to the generated audio signal so as to provide a perception of the desired direction.

In some embodiments direction value is independent of the audio signal but is dependent on the final destination direction. In other words the direction value is based on the final direction rather than the next turn direction.

The operation of generating or determining a direction value associated with the audio signal is shown in FIG. 4 by step 303.

It would be understood that in some embodiments the navigation processor 103 can further generate a distance value. The distance value can for example provide a direction change or final destination distance.

It would be understood that a distance value can be any suitable distance measured in any suitable for such as meters, km, miles, yards, feet.

The operation of generating a distance value associated with the audio signal is shown in FIG. 4 by step 305.

Furthermore it would be understood that in some embodiments the navigation processor 103 outputs a keyword indicator. The keyword indicator is provided by the navigation processor 103 and indicates where audio processing should and should not be applied to the associated audio signal. Thus for example in some embodiments the spatial audio processing can be manually switched off using the user interface. For example a navigation system configured to provide navigation and also playback music can be configured such that the navigation system audio signal are spatially processed but other audio signals are played through the system without spatial processing.

In some embodiments the audio processor 111 can thus be configured to receive the audio signal and associated direction values. The audio processor 111 can then be configured to generate at least one binaural or multi-channel processing parameter or cue based on the direction value. The binaural or multi-channel processing parameter or cues between the output channels can be at least one of ITD (time difference), IID (intensity difference), IPD (phase difference) which when applied can enable the reproduction of the audio signal (or navigation voice) from the direction of the pre-determined navigation angle.

In some embodiments the audio processor 111 can comprise an head related transfer function (HRTF) database wherein the binaural directionality can be provided by selecting HRTF pairs (right and left HRTF signals) based on the target direction or direction value.

In the examples described herein the direction based cues are specific to the horizontal plane. In other words the direction based cues operate within the azimuth range and with a fixed elevation. However in some embodiments the direction based cues can have a variable elevation or the audio processor generate cues for multichannel audio signals with azimuth and elevation parameters.

In some embodiments the cues (such as the direction cues and/or the distance processing parameters) could be provided based on characteristics of the voice commands because some of the cues are more effective for low frequencies, and if the voice command has more lower frequencies then one or more of these cues may be selected based on the voice characteristics.

The operation of generating at least one binaural or directional audio processing parameter or cue based on the direction information is shown in FIG. 4 by step 304.

Furthermore in some embodiments the audio processor 111 can be configured to generate an audio signal gain value or damping value based on the distance value. For example in some embodiments the audio processor can be configured to increase the gain value as the distance value decreases and vice versa.

The optional operation of generating the audio signal gain or amplitude value based on the distance value is shown in FIG. 4 by step 306.

Furthermore in some embodiments the audio processor 111 can be configured to determine whether the keyword indicator is active, in other words whether the audio signal is to be spatially audio signal processed or not.

The operation of detecting whether the audio signal is a keyword is shown in FIG. 4 by step 309.

Where the audio signal is a keyword then the audio signal processor 111 can be configured to activate the directional or spatial processing of the audio signal.

The operation of actuating the spatial processing is shown in FIG. 4 by step 311.

The audio processor 111 can in some embodiments be configured to audio process the audio signal based on a binaural/directional audio parameters and in some embodiments the gain or dampening value based on the signal amplitude distance value.

The audio processor 111 can be configured in some embodiments to perform sound localization of the audio signal. Sound localization is a well-known psychoacoustic nature of the hearing mechanism where the interaural differences, known as time, intensity, phase, enable a user to identify the location or origin of a detected sound in a direction. These interaural differences provide user audible cues for directions. Based on this concept, the audio processor can be configured to process the audio signal to be output to simulate the placement of the audio signal cue in a virtual space.

It would be understood that the audio processor 111 can be configured to generate binaural/multi-channel audio signal processing parameters based on any suitable interaural cue or parameter. In other words in some embodiments the parameter is an amount of time delay which would be sufficient to create a virtual audio image based on the direction. In some embodiments the audio signal processing parameters can be a combination of the interaural parameters, for example time delay and intensity difference towards the same direction in order to enhance the strength of perceived direction (in other words turn right or turn left).

The embodiments as described herein could for example be used in cars where the apparatus and the audio processor 111 are components within an embedded in-car navigation system and are configured to control the navigation audio signal which is played back from the respective speakers in the car.

In a similar manner the same perception can be achieved using headset playback or stereo speakers of the apparatus where the apparatus comprises at least stereo speakers.

For example in some embodiments the apparatus comprises an audio display technology comprising two piezoelectric transducer configured to enable the display to be controlled for playback in order to reproduce a stereo widening control which could provide the desired audio effect. However it would be understood that in some embodiments the apparatus comprises any suitable number of audio transducers (such as integrated hands-free speakers configured to enable stereo or multi-channel playback to provide the desired audio effect.

In some embodiments the perception of a virtual source can be enhanced by comparing the virtual source or the audio signal position to a reference source or audio signal. For example in some embodiments an audio signal can be reproduced off-axis over at least two channel playback (binaural or multi-channel audio) by using the effect of one or more sound localization cues for directionality, where the reproduction would provide a virtual source off-axis. In a similar way, it would be apparent that such localization would be central when no directional information is introduced.

It is therefore suggested playing such directional audio for keywords/phrases only. In such embodiments the use of the audio signal keyword indicator can switch in and out voice guidance spatial processing so to generate reference information presented from a reference direction (for example a virtual source or audio signal located at the center location indicating a time or distance to final destination or other nondirectional information) so that the user can be assisted more effectively.

In example embodiments the mobile device can controls the multi-channel speaker system using a simple and cost effective solution where the mobile phone determines and applies.

Thus in other words the spatial processing parameter or cue determination takes place based on the navigation direction. The audio processor can then determine the amount of interaural differences to be able to generate a virtual source position in the direction of the navigation. The audio processor can then apply the determined processing parameters to the audio signals between at least the left and right channel signals before outputting these signals to the speaker system. It would be understood that in some embodiments the processing parameter determination is relative as the angle of the apparatus (such as the vehicle) to the next direction would be known, therefore said parameter determination is progressively being updated so as to map the direction.

The operation of audio signal processing the audio signal based on the directional audio parameters is shown in FIG. 4 by step 313.

In some embodiments, the apparatus comprising microphones can be configured to monitor the sound field of the environment surrounding the apparatus. In some embodiments the microphone signals can be analyzed so as to determine one or more audio sources and the directionality of the one or more audio sources as well as any ambience information. In some embodiments the apparatus is configured to monitor the audio sources and any ambience information so that in some situations (for example very noisy conditions from road noise), the audio cues can be adjusted for quality and intelligibility. Thus for example in situations of very high noise levels, one or more frequency components (band of frequencies) of the audio cue could be emphasized for improving intelligibility whereas a different equalization could apply for low or normal noisy conditions. In further embodiments the apparatus can be configured to modify or alter the audio signal position to avoid a particularly noise environmental audio source (for example driver's window is open and an unwanted noise source is introduced and the audio signal could be processed so as to produce a virtual image which is opposite direction of the noise source. In some embodiments, the microphone signals can be supported by one or more other types of sensor data (for example compass data, accelerometer data).

It shall be appreciated that the term user equipment is intended to cover any suitable type of wireless user equipment, such as mobile telephones, portable data processing devices or portable web browsers, as well as wearable devices, embedded navigation systems such as in-car integral navigation systems, or any other portable navigation systems.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A method comprising:
generating, for a navigation system coupled to at least two speakers, at least one navigation command for a navigation routing to a target point, wherein the at least one navigation command comprises at least one keyword, where the at least one keyword comprises at least one audio signal or a representation of at least one audio signal;
determining at least one directional audio parameter, where the at least one directional audio parameter provides at least one sound direction that is different from a reference direction, where at least part of a remainder of the at least one navigation command is configured to be perceived from the reference direction during rendering, where the at least one sound direction is configured to be applied for rendering of the at least one keyword, where the at least one directional audio parameter is based on a traveling direction of the navigation routing to the target point;
processing at least the at least one keyword based on the at least one directional audio parameter such that at least one virtual sound image of the traveling direction of the navigation routing is generated based on the processed at least one keyword,
wherein the at least one directional audio parameter comprises at least one audio processing cue and is based on the at least one navigation command, and
wherein the at least one virtual sound image is perceived as coming from the traveling direction of the navigation routing.

2. The method of claim 1, wherein the at least one audio processing cue comprises at least one of:
at least one interaural level difference based on the at least one navigation command;
at least one interaural time difference based on the at least one navigation command;
at least one interaural phase difference based on the at least one navigation command; or
a head related transfer function based on the at least one navigation command.

3. The method as claimed in claim 1, wherein the at least one navigation command further comprises at least one directional indication associated with the at least one keyword, and wherein determining the at least one audio processing cue is based on the at least one directional indication.

4. The method as claimed in claim 1, wherein the method further comprises:
determining at least one distance parameter, where the at least one distance parameter is based on at least one distance indication; and
processing the at least one keyword based further on the at least one distance parameter.

5. The method as claimed in claim 4, wherein the at least one distance parameter comprises a gain value based on at least one distance value.

6. The method as claimed in claim 5, wherein the at least one distance indication comprises at least one volume level, and wherein the gain value is inversely proportional to the at least one distance value, up to a determined maximum gain value so that a playback volume of the at least one navigation command from the at least two speakers does not exceed a threshold.

7. The method as claimed in claim 1, further comprising:
generating at least one visual information element based on the at least one navigation command; and
displaying the at least one visual information element with the navigation system.

8. The method as claimed in claim 1, wherein generating the at least one navigation command comprises:
determining a location of the navigation system with a global positioning system;
determining a destination of the navigation system;
routing the navigation system from the location of the navigation system to the destination of the navigation system; and
generating the at least one navigation command based on the routing.

9. The method as claimed in claim 8, wherein routing the navigation system from the location of the navigation system to the destination of the navigation system comprises determining at least one path from the location of the navigation system to the destination of the navigation system.

10. The method as claimed in claim 8, wherein generating the at least one navigation command based on the routing comprises at least one of:
generating a routing parameter associated with a routing change; or
generating a routing parameter associated with the destination of the navigation system, the routing parameter associated with the destination of the navigation system comprises at least one of:
at least one directional indication, or
at least one distance indication.

11. The method as claimed in claim 1, wherein the at least one audio signal comprises a first channel audio signal and a second channel audio signal.

12. The method as claimed in claim 1, wherein the at least one navigation command comprises a plurality of words, where the plurality of words comprises the at least one keyword and at least one other word, where the remainder of the navigation command comprises the at least one other word.

13. The method as claimed in claim 1, wherein the traveling direction of the navigation routing is different from the reference direction.

14. A apparatus comprising:
   at least one processor; and
   at least one non-transitory memory and computer program code;
   the at least one non-transitory memory and the computer program code configured to, with the at least one processor, cause the apparatus at least to perform:
      generate, for a navigation system coupled to at least two speakers, at least one navigation command for a navigation routing to a target point, wherein the at least one navigation command comprises at least one keyword, where the at least one keyword comprises at least one audio signal or a representation of at least one audio signal;
      determine at least one directional audio parameter, where the at least one directional audio parameter provides at least one sound direction that is different from a reference direction, where at least part of a remainder of the at least one navigation command is configured to be perceived from the reference direction during rendering, where the at least one sound direction is configured to be applied for rendering of the at least one keyword, where the at least one directional audio parameter is based on a traveling direction of the navigation routing to the target point;
      process at least the at least one keyword based on the at least one directional audio parameter such that at least one virtual sound image of the traveling direction of the navigation routing is generated based on the processed at least one keyword,
      wherein the at least one directional audio parameter comprises at least one audio processing cue and is based on the at least one navigation command, and
      wherein the at least one virtual sound image is perceived as coming from the traveling direction of the navigation routing.

15. The apparatus as claimed in claim 14, wherein the at least one navigation command further comprises at least one directional indication associated with the at least one keyword, and wherein determining the at least one audio processing cue is based on the at least one directional indication.

16. The apparatus as claimed in claim 14, wherein the apparatus is further caused to:
   determine at least one distance parameter, where the at least one distance parameter is based on at least one distance indication; and
   process the at least one keyword based further on the at least one distance parameter.

17. The apparatus as claimed in claim 14, wherein the at least one navigation command comprises a plurality of words, where the plurality of words comprises the at least one keyword and at least one other word, where the remainder of the navigation command comprises the at least one other word.

18. A non-transitory computer-readable medium comprising program instructions stored thereon which, when executed with at least one processor, cause the at least one processor to:
   generate, for a navigation system coupled to at least two speakers, at least one navigation command for a navigation routing to a target point, wherein the at least one navigation command comprises at least one keyword, where the at least one keyword comprises at least one audio signal or a representation of at least one audio signal;
   determine at least one directional audio parameter, where the at least one directional audio parameter provides at least one sound direction that is different from a reference direction, where at least part of a remainder of the at least one navigation command is configured to be perceived from the reference direction during rendering, where the at least one sound direction is configured to be applied for rendering of the at least one keyword, where the at least one directional audio parameter is based on a traveling direction of the navigation routing to the target point;
   process at least the at least one keyword based on the at least one directional audio parameter such that at least one virtual sound image of the traveling direction of the navigation routing is generated based on the processed at least one keyword,
   wherein the at least one directional audio parameter comprises at least one audio processing cue and is based on the at least one navigation command, and
   wherein the at least one virtual sound image is perceived as coming from the traveling direction of the navigation routing.

19. The non-transitory computer-readable medium as claimed in claim 18, wherein the at least one navigation command comprises a plurality of words, where the plurality of words comprises the at least one keyword and at least one other word, where the remainder of the navigation command comprises the at least one other word.

20. The non-transitory computer-readable medium as claimed in claim 18, wherein the at least one navigation command further comprises at least one directional indication associated with the at least one keyword, and wherein determining the at least one audio processing cue is based on the at least one directional indication.

* * * * *